US007795594B2

(12) United States Patent
Petrick et al.

(10) Patent No.: US 7,795,594 B2
(45) Date of Patent: Sep. 14, 2010

(54) SYSTEMS FOR READING DATA

(75) Inventors: Scott William Petrick, Sussex, WI (US); Alan Dean Blomeyer, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/574,207

(22) Filed: Oct. 6, 2009

(65) Prior Publication Data

US 2010/0019161 A1 Jan. 28, 2010

Related U.S. Application Data

(63) Continuation of application No. 11/653,013, filed on Jan. 12, 2007, now Pat. No. 7,601,962.

(51) Int. Cl.
*G01T 1/24* (2006.01)
*H01L 27/146* (2006.01)

(52) U.S. Cl. ............................ 250/370.09; 250/370.08

(58) Field of Classification Search ............ 250/370.08, 250/370.09, 332; 378/16, 19, 53
See application file for complete search history.

(56) References Cited

U.S. PATENT DOCUMENTS

| | | | |
|---|---|---|---|
| 6,404,852 | B1 | 6/2002 | Petrick et al. |
| 6,538,253 | B2 | 3/2003 | Petrick et al. |
| 6,718,010 | B2 | 4/2004 | Petrick et al. |
| 2005/0121616 | A1 | 6/2005 | Petrick |
| 2005/0273646 | A1 | 12/2005 | Hillier, III et al. |

*Primary Examiner*—David P Porta
*Assistant Examiner*—Faye Boosalis
(74) *Attorney, Agent, or Firm*—Armstrong Teasdale LLP

(57) ABSTRACT

A system for reading data is provided. The system includes a detector having an array of first semiconductor devices, an array of second semiconductor devices, and an array of photodiodes. The array of photodiodes is coupled to the array of first semiconductor devices and the array of second semiconductor devices.

19 Claims, 7 Drawing Sheets

SYSTEMS FOR READING DATA

CROSS REFERENCE TO RELATED APPLICATIONS

This application is a continuation of prior application Ser. No. 11/653,013, filed Jan. 12, 2007, now U.S. Pat. No. 7,601,962 which is hereby incorporated by reference.

BACKGROUND OF THE INVENTION

This invention relates generally to imaging systems and more particularly to systems and methods for reading data from a detector.

A solid state x-ray detector includes of an array of pixels having a plurality of switches and photodiodes over which Cesium Iodide (CsI) is deposited. The CsI absorbs x-rays and converts the x-rays to light, which is detected by the photodiodes. Each photodiode, due to its construction, acts as a capacitor and stores charge. Initialization of the detector takes place prior to an x-ray exposure, when each photodiode is charged to an initial voltage. The detector is then exposed to the x-rays, which are absorbed by the CsI. The light that is emitted in proportion to a portion of the x-rays partially discharges each photodiode. After the exposure, a voltage on each photodiode is restored to the initial voltage. An amount of charge used to restore the initial voltage on the photodiode is measured, which becomes a measure of an x-ray dose integrated by a pixel during a length of the exposure.

The detector is read or alternatively scrubbed on a row-by-row basis, as controlled by the switches associated with each photodiode. Reading is performed whenever an image acquired by the detector includes exposure data or alternatively offset data. Scrubbing is similar to reading except that data acquired from scrubbing is not interesting, and is therefore discarded. Scrubbing is performed to maintain proper bias on the photodiodes during idle periods, perhaps to reduce a plurality of effects of lag, which is incomplete charge restoration of the photodiodes, or alternatively to maintain a plurality of thresholds of the switches. The thresholds may shift if the switches are kept in an "off" state for long periods, among other reasons. Scrubbing restores charge on each photodiode and the charge need not be measured. If the charge is measured, data acquired from scrubbing can be discarded. Scrubbing is performed to keep the detector ready for use largely due to the less than ideal characteristics of amorphous silicon used to fabricate the detector.

However, scrubbing is undesirable for several reasons. Scrubbing represents non-productive overhead, uses power to perform, the dissipation of which is undesirable especially in low power applications. Scrubbing may create an access time latency before the commencement of the exposure to allow completion of the scrub prior to the start of the exposure. The time used to scrub takes away from the detector's availability.

BRIEF DESCRIPTION OF THE INVENTION

In one aspect, a system for reading data is described. The system includes a detector that includes a first semiconductor device and a second semiconductor device. The second semiconductor device is configured to remove a need to scrub the detector.

In another aspect, an imaging system for reading data is described. The imaging system includes an energy source configured to generate energy that passes through a subject, and a detector configured to receive a portion of the energy. The detector includes a first semiconductor device and a second semiconductor device and the second semiconductor device is configured to remove a need to scrub the detector.

In yet another aspect, a method for reading data is described. The method includes removing a need to scrub a first detector by coupling a first semiconductor device to a second semiconductor device.

In still another aspect, a method for removing image artifacts is described. The method includes coupling a first semiconductor device to a second semiconductor device and a photodiode, and during an activation of the second semiconductor device, applying a potential to the second semiconductor device that is more negative than a potential applied to an anode of the photodiode. The method further includes during the activation of the second semiconductor device, applying a potential to the second semiconductor device similar to a potential of a data line attached to the first semiconductor device subsequently after applying the potential to the second semiconductor device that is more negative than the potential applied to the anode of the photodiode.

DETAILED DESCRIPTION OF THE INVENTION

Figure 1:
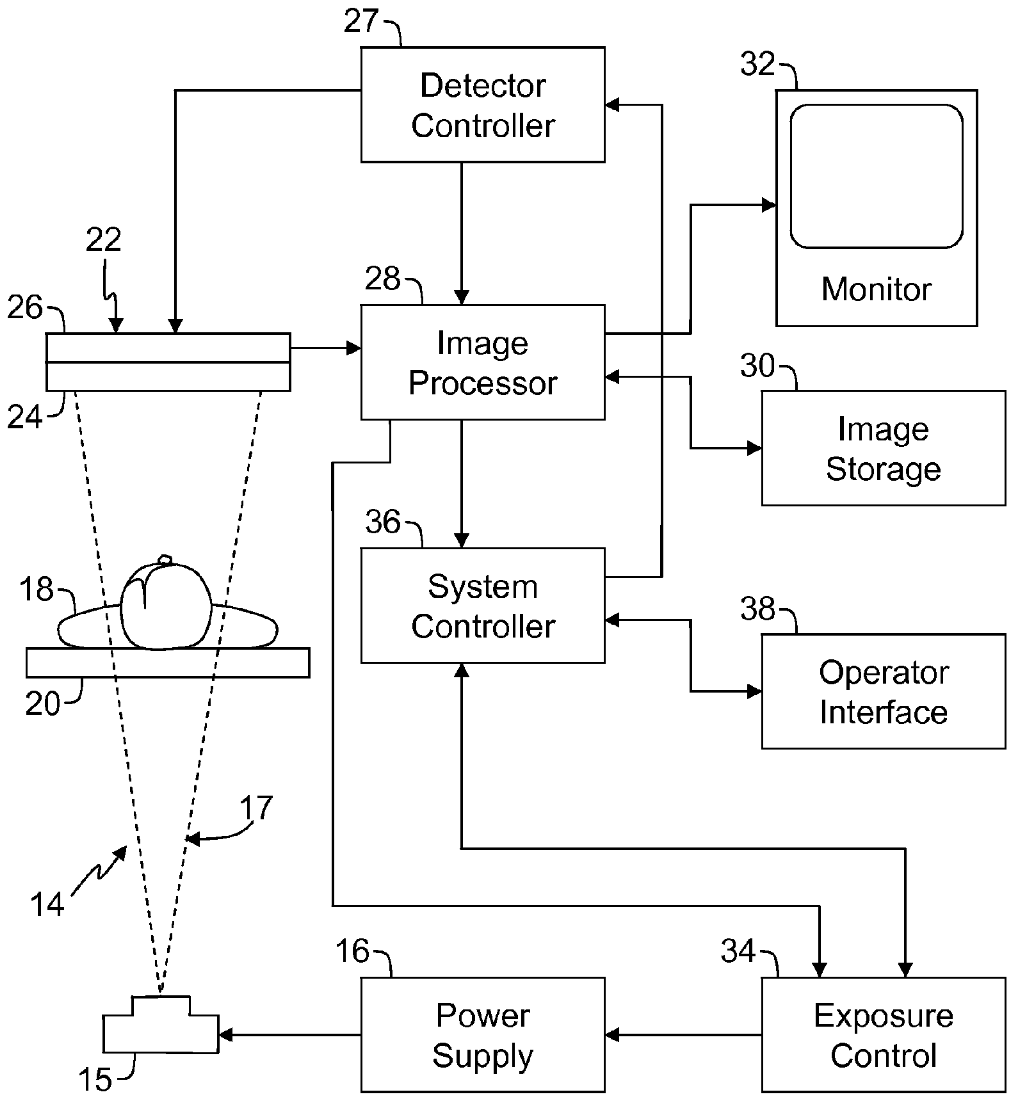
FIG. 1 is a block diagram of an embodiment of an imaging system.

FIG. 1 is a block diagram of an embodiment of an imaging system 14. Imaging system 14 includes source 15, such as an x-ray tube or a gamma ray source, which, when excited by a power supply 16, emits a beam 17, such as an x-ray beam or a gamma ray beam. The beam 17 is directed toward a subject 18, such as a patient or a phantom, lying on a transmissive table 20. A portion of the beam 17 which is transmitted through the transmissive table 20 and the subject 18 impinges upon a detector 22, such as an x-ray or a gamma ray detector. Detector 22 includes a scintillator layer 24 that converts a plurality of higher energy photons of the portion of beam 17 to lower energy photons. The lower energy photons have energies lower than the higher energy photons. Contiguous with the scintillator layer 24 is a photo detector array 26, which converts the lower energy photons into a plurality of electrical signals. A detector controller 27 includes electronics that operates photo detector array 26 to acquire an image, such as an x-ray image or a gamma ray image, and to read an electrical signal from each photo detector element of photo detector array 26. Examples of the x-ray image include a radiographic image, an image of a chest of subject 18, an angiographic image, a cardio graphic image, and a mammographic image.

The electrical signals from the photo detector array 26 are coupled to an image processor 28 that includes circuitry that processes and enhances, such as amplifies or filters, the electrical signals to generate the image. As an example, image processor 28 might apply image reconstruction, such as filtered backprojection (FBP) or maximum intensity projection (MIP) to generate a computed tomography (CT) image or other algorithms to generate diagnostic images from the electrical signals. As used herein, the term controller is not limited to just those integrated circuits referred to in the art as a controller, but broadly refers to a processor, a computer, a microcontroller, a microcomputer, a programmable logic controller, an application specific integrated circuit, a Field Programmable Gate Array, and any other programmable circuit. Moreover, as used herein, the term processor is not limited to just those integrated circuits referred to in the art as a processor, but broadly refers to a controller, a computer, a microcontroller, a microcomputer, a programmable logic controller, an application specific integrated circuit, a Field Programmable Gate Array, and any other programmable circuit.

The image is displayed on a monitor 32 and may be archived in an image storage device 30. Examples of image storage device 30 include a computer-readable medium, such as a hard drive, a volatile memory, a non-volatile memory, a floppy disk, a compact disc-read only memory (CD-ROM), a magneto-optical disk (MOD), and a digital versatile disc (DVD). Examples of monitor 32 include a cathode ray tube (CRT) and a liquid crystal display (LCD). The image processor 28 additionally produces a brightness control signal which is applied to an exposure control circuit 34 to regulate the power supply 16 and to reduce or alternatively increase an exposure of the portion of beam 17 on detector 22. The overall operation of imaging system 14 is governed by a system controller 36 that receives commands from a technician or a person via an operator interface panel 38, such as a mouse or a keyboard.

Figure 2:
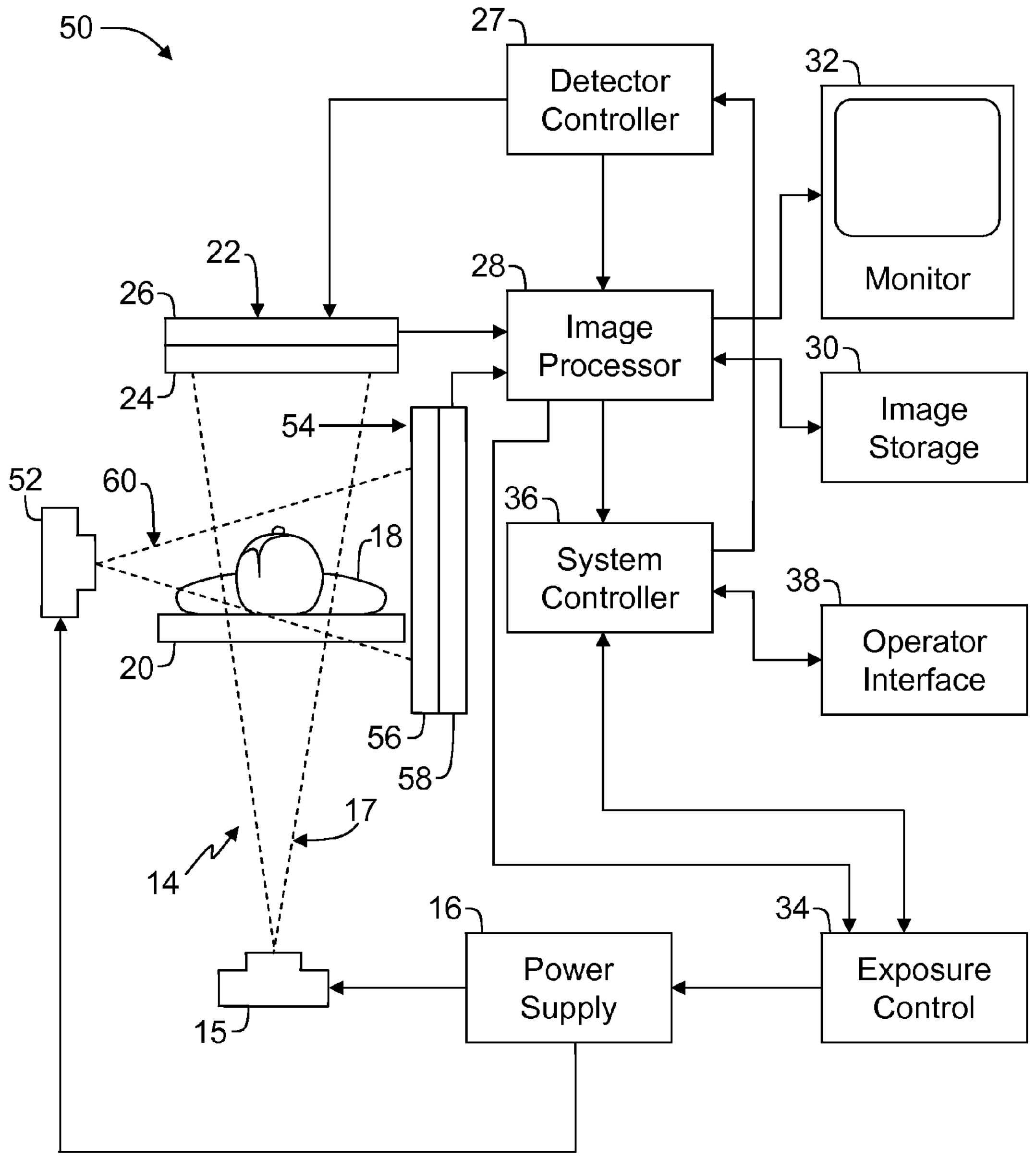
FIG. 2 is a block diagram of another embodiment of an imaging system.

FIG. 2 is a block diagram of another embodiment of an imaging system 50. Imaging system 50 includes imaging system 14. Moreover, imaging system 50 includes a source 52 and a detector 54. Source 52 can be an x-ray source or a gamma ray source. Detector 54 includes a scintillator layer 56 and a photo detector array 58. Source 52 is located at an angle, such as ranging from and including 1 degrees to 179 degrees, with respect to source 15. Moreover, detector 54 forms an angle, such as ranging from and including 1 degrees to 179 degrees, with respect to detector 22. Source 52 and detector 54 are used to acquire to a view of subject 18 different than a view acquired by source 15 and detector 22.

Source 52 generates a beam 60, such as an x-ray beam or a gamma ray beam, directed toward subject 18 when source 52 is excited by power supply 16. Upon passing through subject 18, a portion of beam 60 is transmitted towards detector 54. Scintillator layer 56 converts a plurality of higher energy photons of the portion of beam 60 to a plurality of lower energy photons having energies lower than the higher energy photons. The lower energy photons of the portion of beam 60 lie within a spectrum that can be detected by the photo detector array 58. Photo detector array 58 converts the lower energy photons of the portion of beam 60 into a plurality of electrical signals. Image processor 28 reads the electrical signals from detector 54, and processes and enhances the electrical signals to generate an image, such as an x-ray image or a gamma ray image. For example, image processor 28 applies image reconstruction, such as FBP or MIP or other image processing algorithms, to the electrical signals received from photo detector array to generate the image. The image generated from the electrical signals output by detector 54 is stored in image storage device 30. Image processor 28 produces a brightness control signal that is applied to exposure control circuit 34 to regulate power supply 16 and an exposure of the portion of beam 60 incident on detector 54.

Figure 3:
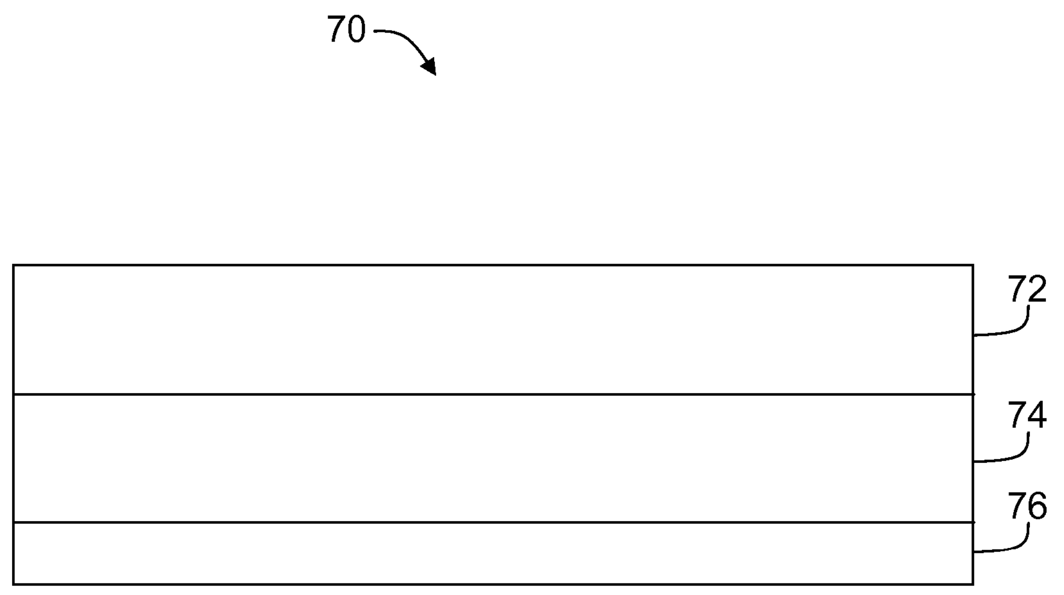
FIG. 3 is a block diagram of an embodiment of a detector of the imaging system of FIG. 2.

FIG. 3 is a block diagram of an embodiment of a detector 70, which is an example of any of detectors 22 and 54. Detector 70 includes a scintillator layer 72, fabricated from a scintillator, such as cesium iodide (CsI). Detector 70 includes a photo detector array 74 and a substrate 76. Photo detector array 74 is an example of one of photo detector array 26 and photo detector array 58. Scintillator layer 72 is an example of one of scintillator layer 24 and scintillator layer 56.

Scintillator layer 72 absorbs the portion of one of the beams 17 and 60 to convert the higher energy photons of the portion of the one of beams 17 and 60 into the lower energy photons of the portion of the one of beams 17 and 60. Photo detector array 74 receives the lower energy photons of the portion of the one of beams 17 and 60 to generate a plurality of electrical signals. Substrate 76 supports photo detector array 74 and scintillator layer 72.

Figure 4:
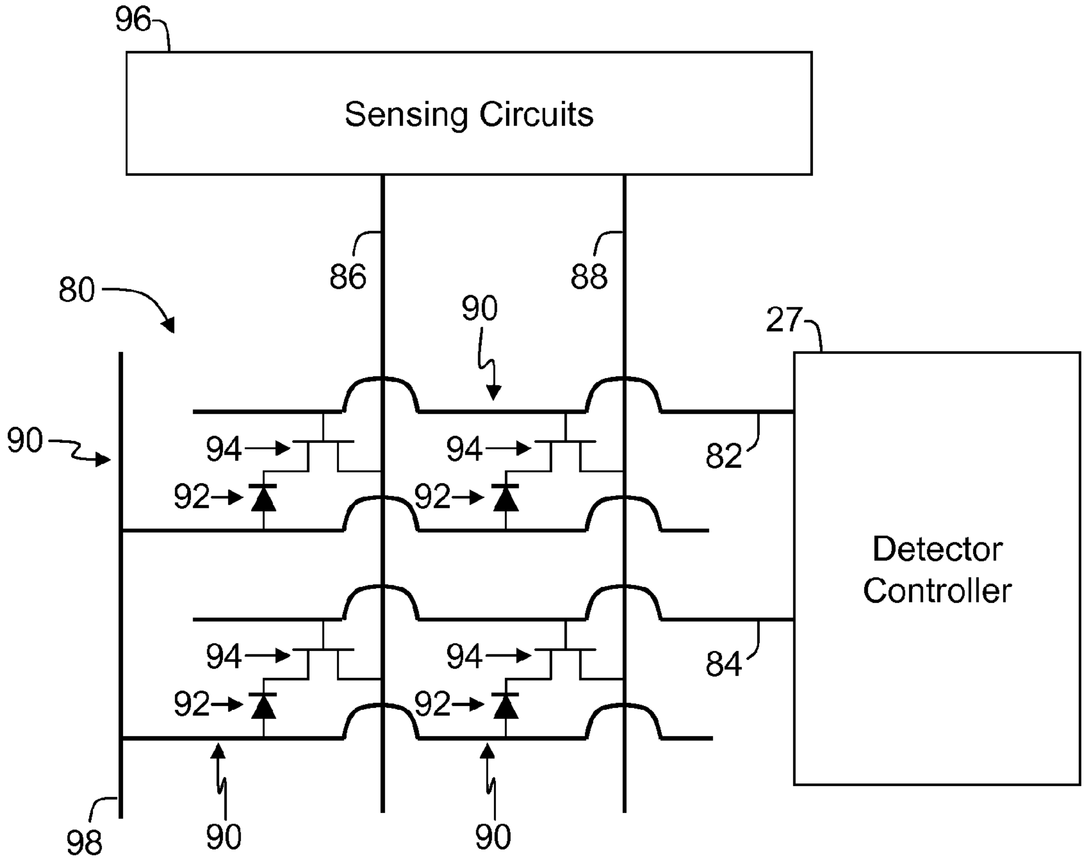
FIG. 4 is a circuit diagram of an embodiment of a photo detector array of the detector.

FIG. 4 is a circuit diagram of an embodiment of a photo detector array 80, which is an example of photo detector array 74. Photo detector array 80 includes a plurality of scan lines 82 and 84, and a plurality of data lines 86 and 88. Photo detector array 80 is formed by a matrix of pixels or detector elements 90. Detector elements 90 are arranged on substrate 76. Each detector element 90 includes a photodiode 92 made of a material, such as silicon. Examples of silicon include amorphous silicon and crystalline silicon. Moreover, each detector element 90 includes a thin film field effect transistor (FET) 94. The photodiode 92 is fabricated over a large portion of detector element 90 in order that the photodiode 92 will intercept a sizeable portion of the light produced by scintillator layer 72. Each photodiode 92 has a capacitance that allows the photodiode 92 to store an electrical charge, which is then partially or alternatively wholly discharged due to an excitation by the lower energy photons of the portion of one of beams 17 and 60.

The cathode of each photodiode 92 in each detector element 90 of each column of the photo detector array 80 is connected via a source-drain conduction path of the FET 94 to one of data lines 86 and 88. Data lines 86 and 88 are connected to a plurality of sensing circuits 96 and sensing circuits 96 maintain data lines 86 and 88 at a constant potential at all times. The sensing circuits 96 are included in the image processor 28. The anode of each photodiode 92 is connected to a common electrode 98. A gate electrode of FET 94 in each row is connected to one of scan lines 82 and 84. Each scan line 82 and 84 runs the full dimension of detector 70. Scan lines 82 and 84 are coupled to the detector controller 27. In another embodiment, photo detector array 80 is formed of any integer, m, of scan lines and any integer, n, of data lines.

Figure 5:
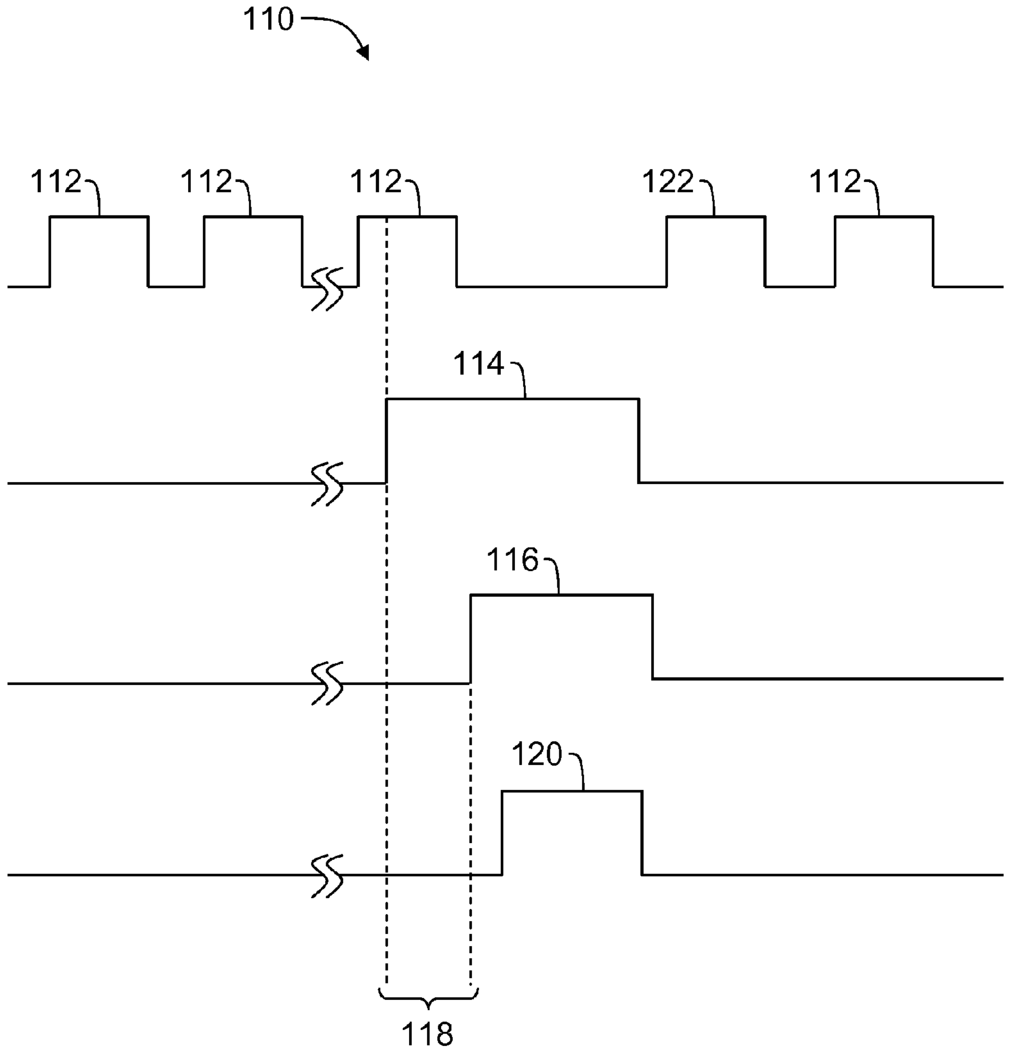
FIG. 5 is a timing diagram illustrating an embodiment of a method of reading data from the photo detector array of FIG. 4.

FIG. 5 is a timing diagram 110 illustrating an embodiment of a method of reading data from a detector. To acquire an image, such as an x-ray image or a gamma ray image, by using detector 70, initially, detector 70 is scrubbed 112. Scrubbing 112 may be performed to maintain a known potential or a known voltage on the photodiodes 92 during idle periods, to reduce a plurality of effects of image retention or lag, and/or to protect a plurality of operating characteristics of the FETs 94. Sensing circuits 96 restore charge of the photodiodes 92 of detector elements 90 of detector 70 during scrubbing 112. One of scan lines 82 and 84 being scrubbed 112 operates detector elements 90 connected to a corresponding one of data lines 86 and 88. For example, detector element 90 connected to data line 86 is operated to scrub 112 scan line 82. During scrub 112, a high negative voltage, such as –a volts, is applied to the common electrode 98 by a power source (not shown), where a is a positive real number other than zero. The sensing circuits 96 apply a low negative voltage, such as −b volts, to data lines 86 and 88 that is lower than the high negative voltage, where b is a positive real number. The number b is lower than the number a.

Moreover, during scrub 112, detector controller 27 switches scan lines 82 and 84 from a voltage, such as −c volts, more negative than the high negative voltage of common electrode 98 to a positive voltage, causing the FETs 94 attached to scan lines 82 and 84 to begin to conduct, where c is a positive real number. The number c is higher than the number a. Detector controller 27 includes a plurality of drive circuits to drive or provide power to scan lines 82 and 84. During scrub 112, the photodiode 92 continues to store charge until a voltage across the photodiode 92 is equal to a voltage difference between a corresponding one of data lines 86 and 88 and common electrode 98 and until the photodiode 92 is charged to the known voltage, after which the FETs 94 are switched off. For example, the photodiode 92 continues to store charge until a voltage across the photodiode 92 is equal to a voltage difference between data line 88 and common electrode 98. To end scrub 112, the FETs 94 are switched off by detector controller 27, which reapplies, to scan lines 82 and 84, a potential, such as −c or −d volts, that is more negative than the high negative voltage of common electrode 98, where d is a positive real number. The number d is higher than the number a. Image data used to produce an image, such as an x-ray or a gamma ray image, is not acquired during scrub 112.

Before system controller 28 controls power supply 16 to activate one of sources 15 and 52, system controller 28 makes an exposure request 114. Upon receiving exposure request 114, detector controller 27 determines whether scrub 112 has ended. Upon determining that scrub 112 has not ended, detector controller 27 does not grant 116 exposure request 114 received from system controller 28. On the other hand, upon determining that scrub 112 has ended, detector controller 27 grants 116 exposure request 114 received from system controller 28. A scrub latency 118, which is a time difference between a start of exposure request 114 and a start of grant 116 of exposure request 114 is developed. Detector 70 is exposed 120 to the portion of one of beams 17 and 60, which is controlled by an amount of power supplied to a corresponding one of sources 15 and 52. Detector 70 is exposed 120 during grant 116 of exposure request 114.

When the lower energy photons of the portion of one of beams 17 and 60 strike photodiode 92, the photodiode 92 conducts and a capacitance of photodiode 92 is partially discharged. An amount of charge removed from the capacitance of photodiode 92 depends upon an amount of the lower energy photons of the portion of one of beams 17 and 60, and the amount depends upon an intensity and duration of the portion of one of beams 17 and 60 that strikes scintillator layer 72 during exposure 120.

Upon termination of the exposure 120 of detector 70 to the portion of one of beams 17 and 60, a charge in each photodiode 92 is restored to the known voltage before the exposure. The exposure 120 of detector 70 to the portion of one of beams 17 and 60 terminates when system controller 28 controls power supply 16 to discontinue supplying power to one of sources 15 and 52.

Upon termination of the exposure 120 of detector 70 to the portion of one of beams 17 and 60, detector controller 27 reads 122 detector 70 by sequentially applying a positive voltage to scan lines 82 and 84. The image data is acquired by sensing circuits 96 during read 122. When one of scan lines 82 and 84 is positively biased, the FETs 94 connected to the one of scan lines 82 and 84 are turned on to couple the corresponding photodiodes 92 in the selected row to a corresponding one of data lines 86 and 88. For example, when scan line 82 is positively biased, the FET 94 connected to the scan line 82 is turned on to couple the photodiode 92 to data line 86. An amount of charge used to restore the voltage difference between the one of data lines 86 and 88 and common electrode 98 to the known voltage is measured by the sensing circuits 96.

Detector 70 is scrubbed 112 after detector 70 is read 122. Sensing circuits 96 restore charge, if necessary, to photodiode 92 during scrub 112 in order to restore the potential across the photodiode 92. If sensing circuits 96 measure the charge used to restore the voltage across photodiode 92 during scrub 112, the measurement is discarded.

Figure 6:
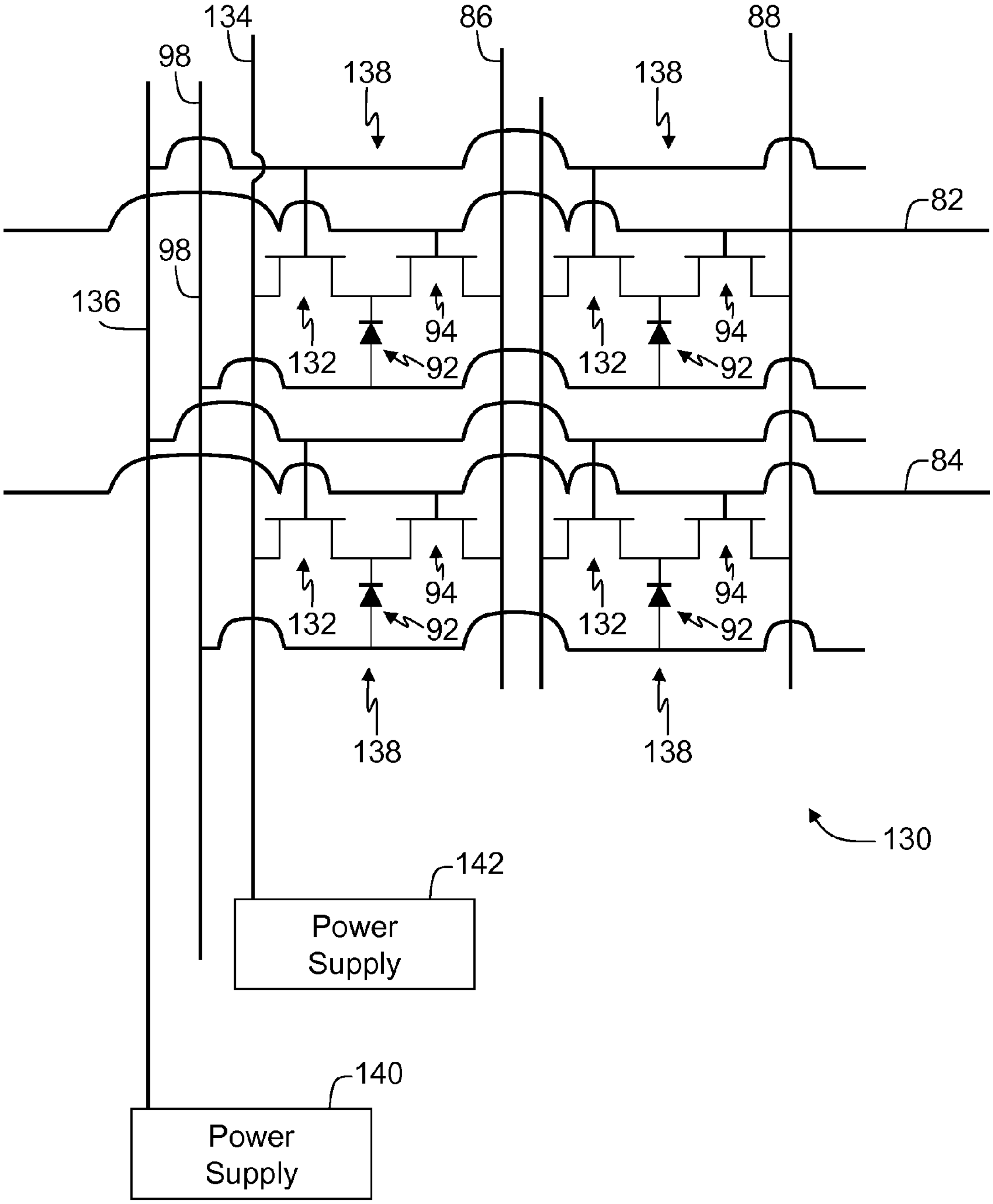
FIG. 6 is a circuit diagram of another embodiment of a photo detector array of the detector.

FIG. 6 is a circuit diagram of an embodiment of a photo detector array 130, which is another example of photo detector array 74. Photo detector array 130 includes scan lines 82 and 84, data lines 86 and 88, FETs 94, and photodiodes 92. Moreover, photo detector array 130 includes a plurality of FETs 132, such as an N-type metal-oxide semiconductor FET. A source electrode of FET 94 is coupled to a source electrode of FET 132. Moreover, a drain electrode of FET 132 is coupled to a maintenance potential electrode 134 and a gate electrode of FET 132 is coupled to a maintenance control electrode 136. Moreover, the source electrode of FET 132 is coupled to the cathode of photodiode 92.

Photodiodes 92, FET 94, and FET 132 form a pixel 138. Maintenance control electrode 136 is electrically connected to a power supply 140, such as a voltage source. Moreover, maintenance potential electrode 134 is electrically coupled to a power supply 142, such as a voltage source.

It is noted that in another embodiment, another type of device, such as a bipolar junction transistor (BJT), can be used, with a selection of supply voltages 140 and 142, instead of FET 132. For example, a base of the BJT is coupled to maintenance control electrode 136, an emitter of the BJT is coupled to maintenance potential electrode 134, and a collector of the BJT is coupled to the cathode of photodiode 92 and the source electrode of FET 94. Examples of the BJT include an NPN BJT and a PNP BJT. Moreover, other types of devices, such as a P-type MOSFET, a Junction FETs (JFETs), metal-semiconductor FET (MESFETs), or a diode, can be used instead of FET 132. In another embodiment, photo detector array 130 includes any number of pixels 138.

Figure 7:
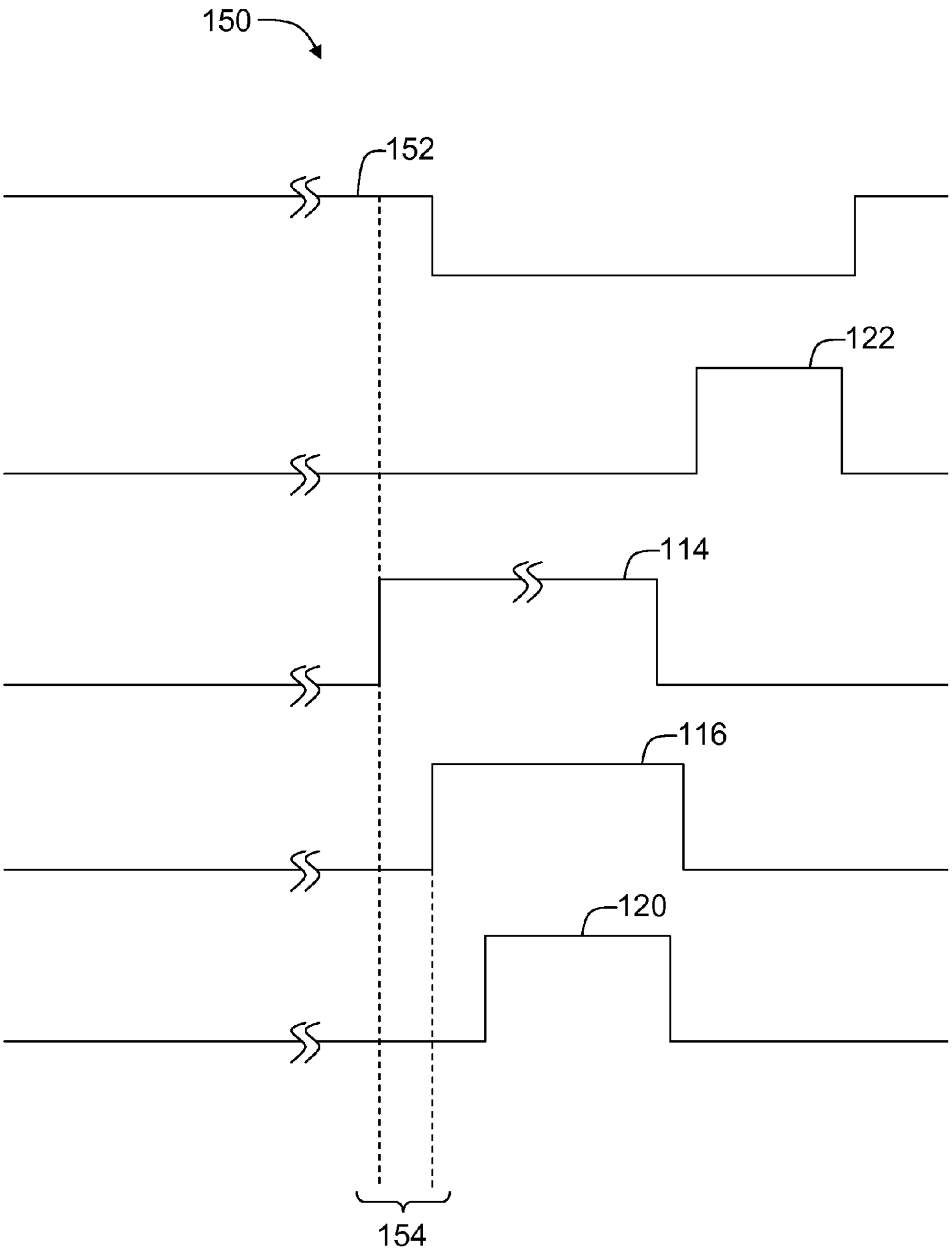
FIG. 7 is a timing diagram illustrating an embodiment of a method of reading data from the photo detector array of FIG. 6.

FIG. 7 is a timing diagram 150 illustrating an embodiment of a method of reading data from photo detector array 130. Power supply 140 applies a voltage 152 to maintenance control electrode 136 to maintain a bias across photodiode 92. A magnitude of voltage 152 applied to FETs 132 to activate or turn on FETs 132 is more positive, such as e volts, than the low negative voltage, such as −b volts, applied by the sensing circuits 96 to data lines 86 and 88, and the more positive voltage 152 is applied to maintain bias across photodiode 92, where e is a positive real number. The number e is higher than 0, which is greater than −b. The higher the voltage e applied to maintenance control electrode 136 of FETs 132, the "harder" FETs 132 will turn "on", i.e. with lower impedance. A voltage applied to maintenance potential electrode 134 from power supply 142 is similar to a voltage applied to at least one of data lines 86 and 88 to maintain bias across photodiode 92. For example, the voltage applied to maintenance potential electrode 134 ranges from and including a voltage applied to data line 86 to a voltage applied to common electrode 98. As another example, when a voltage applied to data line 86 is −f volts and a voltage applied to common electrode 98 is −g volts, the voltage applied to maintenance potential electrode 134 ranges from and including −f volts to −g volts, where f and g are real and positive numbers and f is less than g. As another example, the voltage applied to maintenance potential electrode 134 ranges from and including a voltage applied to data line 88 to a voltage applied to common electrode 98. As yet another example, when a voltage applied to data line 88 is −f volts and a voltage applied to common electrode 98 is −g volts, the voltage applied to maintenance potential electrode 134 ranges from and including −f volts to −g volts. Photodiode 92 charges when the bias is maintained across photodiode 92.

Moreover, the bias across photodiode 92 is maintained at a time at which sensing circuits 96 and detector controller 27 are deactivated, turned off, or not powered by a power supply (not shown) within detector 70. Additionally, the bias across photodiode 92 is maintained at a time during which detector 70 is at least one of not exposed 120, not read 122, and not integrating offset data. Sensing circuits 96 are controlled by system controller 36 to prevent sensing circuits 96 from reading 122 from detector 70 until a certain time. The prevention until the certain time integrates offset data.

When exposure request 114 is received from system controller 28, detector controller 27 is not scrubbing 112 and does not need to wait to finish scrubbing 112 before granting 116 exposure request 114. When exposure request 114 is received from system controller 28, power supply 140 reduces voltage supplied to gate electrodes of FETs 132 to −c or alternatively −d volts to deactivate or turn off FETs 132. By turning off FETs 132, the bias is discontinued to be maintained across photodiode 92 and photodiode 92 discontinues to be charged by maintenance potential electrode 134. When the bias is discontinued to be maintained across photodiode 92, detector controller 27 grants 116 exposure request 114 received from system controller 28. At an end of exposure request 114, detector 70 is read 122 by sensing circuits 96. Detector 70 is read 122 by sensing circuits 96 and scrub 112 is not performed by using FETs 132. A non-scrub latency 154, which is a time difference between a start of exposure request 114 and a start of grant 116 of grant 116 of exposure request 114 is less than scrub latency 118.

In one embodiment, the voltage applied to maintenance potential electrode 134 is equal to a value at one of data lines 86 and 88. In another embodiment, when the bias is maintained across photodiode 92 of detector 54, detector 22 is exposed to the portion of beam 17. After exposure of detector 22 to the portion of beam 17, the bias is discontinued to be maintained across photodiode 92 of detector 54. Moreover, when the bias is discontinued to be maintained across photodiode 92 of detector 54, the detector 54 is exposed to the portion of beam 60. After exposure of detector 54 to the portion of beam 60, detectors 22 and 54 are read 122 by sensing circuits 96. It is noted that exposing detector 22 during maintenance of the bias across photodiode 92 of detector 54 reduces, such as eliminates, the effect of scatter, generated by the portion of beam 17, on detector 54.

It is further noted that offset data is read by sensing circuits 96 from detector 70 in a similar, such as the same, manner in which the image data is read from detector 70 during read 122 except that there is no exposure 120 made. Image Processor 28 subtracts the offset data from the image data to account for any non-zero signal contribution outside of exposure signal, such as diode leakage and any differences between a potential of maintenance potential electrode 134 and a potential of any one of data lines 86 and 88. Moreover, during activation or turning on of FET 132, artifacts are removed by applying to maintenance potential electrode 134, the voltage that is more negative, such as −h volts, than a voltage, such as −i volts, applied to common electrode 98, where h and i are positive real numbers. The number h is higher or greater than the number i. Additionally, during the activation of FET 132, artifacts are removed by applying to FET 132 a voltage that is similar to a potential of data line 86 attached to transistor FET 94 subsequently after applying to maintenance potential electrode 134, the voltage that is more negative, such as −h volts, than a voltage, such as −i volts, applied to common electrode.

Technical effects of the herein described systems and methods for reading data include reducing a time and power utilized to scrub 112 detector 70. Moreover, removing a need to scrub 112 detector 70 also results in non-scrub latency 154 being less than the scrub latency 118. Power is limited when detector 70 is portable and is powered by a battery. The power utilized by sensing circuits 96 to scrub 112 detector 70 is saved when detector 70 is not scrubbed.

While the invention has been described in terms of various specific embodiments, those skilled in the art will recognize that the invention can be practiced with modification within the spirit and scope of the claims.

What is claimed is:

1. An imaging system, said system comprising a detector comprising:

an array of first semiconductor devices;

an array of second semiconductor devices; and an array of photodiodes coupled to said array of first semiconductor devices and said array of second semiconductor devices.

2. An imaging system in accordance with claim 1, wherein said array of first semiconductor devices comprises an array of first field effect transistors (FETs) each including a source electrode; and said array of second semiconductor devices comprises an array of second FETs each including a source electrode, wherein each source electrode of said array of first FETs is coupled to a respective source electrode of said array of second FETs.

3. An imaging system in accordance with claim 1 wherein each photodiode of said array of photodiodes is coupled to a first semiconductor device and a second semiconductor device, a potential maintained across at least one photodiode by activating a respective second semiconductor device when said detector is at least one of not being read, not exposed to x-rays, and not allowed to integrate an offset signal.

4. An imaging system in accordance with claim 1, wherein each second semiconductor device comprises an FET including a gate electrode and a drain electrode, said system further comprising:

a data line coupled to a plurality of first semiconductor devices;

a maintenance control electrode; and a maintenance potential electrode, each said gate electrode coupled to said maintenance control electrode and each said drain electrode coupled to said maintenance potential electrode, said maintenance potential electrode maintained at a potential similar to a potential of said data line.

5. An imaging system in accordance with claim 1, wherein each second semiconductor device comprises an FET including a gate electrode and a drain electrode, said system further comprising:

a maintenance potential electrode; and a maintenance control electrode, each said gate electrode coupled to said maintenance control electrode and each said drain electrode coupled to said maintenance potential electrode, said maintenance control electrode maintained at a first potential when said maintenance potential electrode is maintained at a second potential and said detector is at least one of not being read, not exposed to x-rays, and not allowed to integrate an offset signal.

6. An imaging system in accordance with claim 5, wherein the first potential and the second potential are selected to maintain a charge of said array of photodiodes.

7. An imaging system in accordance with claim 1, wherein said detector comprises a plurality of pixels, each pixel of said plurality of pixels comprises a first semiconductor device of said array of first semiconductor devices, a second semiconductor device of said array of said second semiconductor devices, and a photodiode of said array of photodiodes.

8. An imaging system in accordance with claim 1, wherein each second semiconductor device comprises an FET including a gate electrode and a drain electrode, said system further comprising:

a maintenance potential electrode;

a maintenance control electrode, each said gate electrode coupled to said maintenance control electrode and each said drain electrode coupled to said maintenance potential electrode;

a first power supply coupled to said maintenance potential electrode and configured to apply a voltage to said maintenance potential electrode; and a second power supply coupled to said maintenance control electrode and configured to apply a voltage to said maintenance control electrode.

9. An imaging system in accordance with claim 1 further comprising a controller coupled to said array of first semiconductor devices, said array of second semiconductor devices, and said array of photodiodes, said controller configured to:

apply a first voltage to at least one data line coupled to a plurality of first semiconductor devices of said array of first semiconductor devices using sensing circuits coupled to the at least one data line, the sensing circuits configured to maintain the at least one data line at a substantially constant potential;

apply a second voltage to a maintenance control electrode coupled to said array of second semiconductor devices to activate said array of second semiconductor devices;

apply a third voltage to a maintenance potential electrode coupled to said array of second semiconductor devices to maintain the bias across said array of photodiodes;

deactivate said array of second semiconductor devices after receiving an exposure request, wherein deactivating said array of second semiconductor devices terminates the application of at least the second voltage;

integrate a signal using said detector during one of exposure to radiation and collection of offset data;

read image data from said detector after termination of the integration of the signal, the image data read via at least one scan line coupled to said plurality of first semiconductor devices; and reapply at least the second voltage.

10. An imaging system comprising:

an energy source configured to generate energy that passes through a subject positioned within said imaging system; and a detector configured to receive at least a portion of the energy passing through the subject, said detector comprises:

a first semiconductor device;

a second semiconductor device; and a photodiode coupled to said first semiconductor device and said second semiconductor device.

11. An imaging system in accordance with claim 10, wherein said first semiconductor device comprises a first field effect transistor (FET) including a source electrode; and said second semiconductor device comprises a second FET including a source electrode, said source electrode of said first FET coupled to said source electrode of said second FET.

12. An imaging system in accordance with claim 10, wherein a potential is maintained across said photodiode by activating said second semiconductor device when said detector is at least one of not being read, not exposed to x-rays, and not allowed to integrate an offset signal.

13. An imaging system in accordance with claim 10, wherein said second semiconductor device comprises an FET including a gate electrode and a drain electrode, said system further comprising:

a data line coupled to said first semiconductor device;

a maintenance control electrode; and a maintenance potential electrode, said gate electrode coupled to said maintenance control electrode and said drain electrode coupled to said maintenance potential electrode, said maintenance potential electrode maintained at a potential similar to a potential of said data line.

14. An imaging system in accordance with claim 10, wherein said second semiconductor device comprises an FET including a gate electrode and a drain electrode, said system further comprising:

a maintenance potential electrode; and a maintenance control electrode, said gate electrode coupled to said maintenance control electrode and said drain electrode coupled to said maintenance potential electrode, said maintenance control electrode maintained at a first potential when said maintenance potential electrode is maintained at a second potential and said detector is at least one of not being read, not exposed to x-rays, and not allowed to integrate an offset signal.

15. An imaging system in accordance with claim 14, wherein the first potential and the second potential are selected to maintain the charge of said photodiode.

16. An imaging system in accordance with claim 10, wherein said detector comprises a plurality of pixels, said first semiconductor device and said second semiconductor device located within the same pixel of said plurality of pixels.

17. A system in accordance with claim 10, wherein said second semiconductor device comprises an FET including a gate electrode and a drain electrode, said system further comprising:

a maintenance potential electrode;

a maintenance control electrode, said gate electrode coupled to said maintenance control electrode and said drain electrode coupled to said maintenance potential electrode;

a first power supply coupled to said maintenance potential electrode and configured to apply a voltage to said maintenance potential electrode; and a second power supply coupled to said maintenance control electrode and configured to apply a voltage to said maintenance control electrode.

18. A system in accordance with claim 10 further comprising a controller coupled to said first semiconductor device, said second semiconductor device, and said photodiode, said controller configured to:

apply a first voltage to at least one data line coupled to said first semiconductor device using sensing circuits coupled to the at least one data line, the sensing circuits configured to maintain the at least one data line at a substantially constant potential;

apply a second voltage to a maintenance control electrode coupled to said second semiconductor device to activate said second semiconductor device;

apply a third voltage to a maintenance potential electrode coupled to said second semiconductor device to maintain the bias across said photodiode;

deactivate said second semiconductor device after receiving an exposure request, wherein deactivating said second semiconductor device terminates the application of at least the second voltage;

integrate a signal using said detector during one of exposure to radiation and collection of offset data;

read image data from said detector after termination of the integration of the signal, the image data read via at least one scan line coupled to said first semiconductor device; and reapply at least the second voltage.

19. An imaging system comprising:

a detector comprising:

an array of first semiconductor devices;

an array of second semiconductor devices; and an array of photodiodes that are configured to be exposed to a radiation beam, said array of photodiodes coupled to said array of first semiconductor devices and said array of second semiconductor devices; and a controller coupled to said detector, said controller configured to:

apply a first voltage to at least one data line coupled to said array of first semiconductors device using sensing circuits, the sensing circuits configured to maintain the data lines at a substantially constant potential;

apply a second voltage to a maintenance control electrode coupled to said array of second semiconductor devices to activate said array of second semiconductor devices;

apply a third voltage to a maintenance potential electrode coupled to said array of second semiconductor devices to maintain the bias across said array of photodiodes, the third voltage approximately equal to the first voltage;

adjust the third voltage to a fourth voltage that is more negative than an anode of at least one photodiode of said array of photodiodes for a period of time while the second voltage is being applied;

reapply the third voltage to the maintenance potential electrode after the period of time expires; and apply a fifth voltage to the maintenance control electrode to deactivate said array of second semiconductor devices thereby discontinuing the maintenance of the bias across said array of photodiodes.

* * * * *